(12) United States Patent
Jogand-Coulomb et al.

(10) Patent No.: US 9,015,479 B2
(45) Date of Patent: Apr. 21, 2015

(54) HOST DEVICE AND METHOD FOR SUPER-DISTRIBUTION OF CONTENT PROTECTED WITH A LOCALIZED CONTENT ENCRYPTION KEY

(75) Inventors: Fabrice E. Jogand-Coulomb, Allauch (FR); Henry R. Hutton, Tracy, CA (US); Jason T. Lin, Los Gatos, CA (US); Joseph E. Halpern, Santa Clara, CA (US); Rotem Sela, Haifa (IL)

(73) Assignee: SanDisk Technologies Inc., Plano, TX (US)

( * ) Notice: Subject to any disclaimer, the term of this patent is extended or adjusted under 35 U.S.C. 154(b) by 311 days.

(21) Appl. No.: 13/328,823

(22) Filed: Dec. 16, 2011

(65) Prior Publication Data

US 2013/0159707 A1     Jun. 20, 2013

(51) Int. Cl.
*H04L 9/14* (2006.01)
*H04L 9/08* (2006.01)
*G06F 21/10* (2013.01)

(52) U.S. Cl.
CPC ..................................... *G06F 21/10* (2013.01)

(58) Field of Classification Search
CPC ..... G06F 21/57; G06F 21/53; G06F 21/6218; G06F 21/74; G06F 21/10; H04L 9/083
USPC ................... 713/164, 156; 380/277, 278, 44; 705/51, 59, 64, 71
See application file for complete search history.

(56) References Cited

U.S. PATENT DOCUMENTS

| | | | |
|---|---|---|---|
| 6,097,814 A | 8/2000 | Mochizuki | |
| 7,380,135 B2 * | 5/2008 | Nishimoto et al. | ........... 713/193 |
| 7,590,866 B2 | 9/2009 | Hurtado et al. | |
| 7,624,451 B2 | 11/2009 | Peinado | |
| 8,165,304 B2 * | 4/2012 | Choi et al. | ..................... 380/277 |
| 8,489,885 B2 * | 7/2013 | Wang et al. | .................... 713/176 |
| 2002/0112171 A1 | 8/2002 | Ginter et al. | |
| 2003/0182579 A1 | 9/2003 | Leporini et al. | |
| 2004/0253942 A1 | 12/2004 | Mowry et al. | |

(Continued)

FOREIGN PATENT DOCUMENTS

| | | |
|---|---|---|
| EP | 1 195 974 A1 | 4/2002 |
| WO | WO 00/59152 A2 | 10/2000 |
| WO | WO 2006/031127 | 3/2006 |
| WO | WO 2007/096813 A1 | 8/2007 |

OTHER PUBLICATIONS

Office Action for U.S. Appl. No. 13/328,843, dated Jun. 27, 2012, 11 pages.

(Continued)

*Primary Examiner* — Michael Chao
*Assistant Examiner* — Shu Chun Gao
(74) *Attorney, Agent, or Firm* — Brinks Gilson & Lione (57) ABSTRACT

In one embodiment, a host device creates a super-distribution token by encrypting a content encryption key with a super-distribution key and stores the super-distribution token and encrypted content retrieved from a source storage device in a target storage device. In another embodiment, a host device provides a super-distribution token to a server, wherein the server is configured to generate an activation token from the super-distribution token, receive the activation token from the server, retrieve a content encryption key from the activation token, and decrypt encrypted content received from a storage device using the content encryption key retrieved from the activation token.

84 Claims, 6 Drawing Sheets

(56) References Cited

U.S. PATENT DOCUMENTS

| | | |
|---|---|---|
| 2006/0242068 A1 | 10/2006 | Jogand-Coulomb et al. |
| 2007/0112676 A1* | 5/2007 | Kontio et al. ............... 705/50 |
| 2007/0179898 A1 | 8/2007 | Medvinsky et al. |
| 2007/0198417 A1* | 8/2007 | Alve ............................ 705/51 |
| 2007/0299780 A1 | 12/2007 | Vanska et al. |
| 2008/0010451 A1 | 1/2008 | Holtzman et al. |
| 2008/0162354 A1* | 7/2008 | Alve et al. ................... 705/51 |
| 2008/0234047 A1 | 9/2008 | Nguyen |
| 2009/0060201 A1 | 3/2009 | Rhodes et al. |
| 2009/0276829 A1 | 11/2009 | Sela et al. |
| 2010/0310076 A1 | 12/2010 | Barzilai et al. |

OTHER PUBLICATIONS

B. Ramsdell, "Secure/Multipurpose Internet Mail Extensions (S/MIME) Version 3.1 Message Specification," Sendmail, Inc., Jul. 2004, pp. 1-37.

Office Action for U.S. Appl. No. 13/328,843, dated Nov. 28, 2012, 14 pages.

International Search Report and Written Opinion for PCT/US2012/067190, dated Mar. 1, 2013, 10 pages.

International Search Report and Written Opinion for PCT/US2012/067191, dated Mar. 1, 2013, 9 pages.

* cited by examiner

HOST DEVICE AND METHOD FOR SUPER-DISTRIBUTION OF CONTENT PROTECTED WITH A LOCALIZED CONTENT ENCRYPTION KEY

BACKGROUND

A removable storage device, such as a Secure Digital (SD) card or a MultiMedia Card (MMC), can be used to store digital content, such as a song or a movie. To prevent unauthorized access and control copying of the stored content, the content can be encrypted with a content encryption key, where only authorized entities are able to use the key to decrypt the content. While a storage device can be pre-loaded with content, in some environments, the content is downloaded to the storage device from a server (e.g., via a mobile phone that is hosting the storage device). In such situations, the server can encrypt the content with a content encryption key, send the content encryption key to the storage device securely or via a secure channel, and send the encrypted content to the storage device via an open channel.

In some environments (sometimes referred to as "super-distribution" environments), a user is allowed to freely copy the encrypted content (but not the content encryption key) to other storage devices. Since the content is encrypted and the content encryption key is not copied along with the content, the content on the target storage device will not be renderable. In order to render the content, the user of the target storage device requests or purchases the content encryption key from a digital rights management (DRM) server. The content encryption key can be part of a "rights object" that contains rules on when and how the content encryption key can be used to access the content. Such environments are often desired by service providers and mobile phone operators because the free redistribution of protected content creates opportunities for use of the mobile phone to contact the service provider to purchase a content encryption key.

A problem can occur, however, when the server is not aware of the content encryption key internally-generated by a storage or host device. In such a situation, since the server is not aware of the content encryption key, the server is unable to respond on its own to requests from target storage devices for the content encryption key. As such, content protected in this fashion would be tied to the storage or host device that generated the content encryption key, thus preventing access to super-distributed content.

OVERVIEW

Embodiments of the present invention are defined by the claims, and nothing in this section should be taken as a limitation on those claims.

By way of introduction, the below embodiments relate to a host device and method for super-distribution of content protected with a localized content encryption key. In one embodiment, a host device creates a super-distribution token by encrypting a content encryption key with a super-distribution key and stores the super-distribution token and encrypted content retrieved from a source storage device in a target storage device. In another embodiment, a host device provides a super-distribution token to a server, wherein the server is configured to generate an activation token from the super-distribution token, receive the activation token from the server, retrieve a content encryption key from the activation token, and decrypt encrypted content received from a storage device using the content encryption key retrieved from the activation token.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

As mentioned in the background section above, in situations where a storage or host device protects content with an internally-generated content encryption key, a server will not be able to respond to requests from a target storage device to access redistributed content because the server is not aware of the content encryption key. The same problem occurs if the content encryption key is obtained by the storage or host device from an entity other than the server. The embodiments discussed below can be used to overcome these problems and allow content protected in this manner to be super-distributed. In general, the host or storage device in these embodiments can use a separate key (referred to herein as a super-distribution key) known to, and controlled by, a server to encrypt the content encryption key, and the encrypted content encryption key is super-distributed along with the encrypted content. In this way, even though the server may not be aware of the content encryption key, it is aware of data needed to decrypt the content encryption key. This ensures that super-distribution remains controlled by a server that is capable of ensuring that the content encryption key can be used for the redistributed content, thereby returning a level of control to the server that is otherwise taken away when the content encryption key is localized to the storage or host device. Also, in some embodiments, the server does not know the super-distribution key but instead has a way to import the super-distribution key to a target device.

Before turning to these and other embodiments, the following section describes exemplary host and storage devices. It should be noted that these exemplary host and storage devices are merely examples and that other architectures can be used. It should also be noted that the methods described below are architecture independent, as the use of a content encryption key that is protected and unknown to the server is not dependent on a specific architecture.

Exemplary Host and Storage Devices

Figure 1:
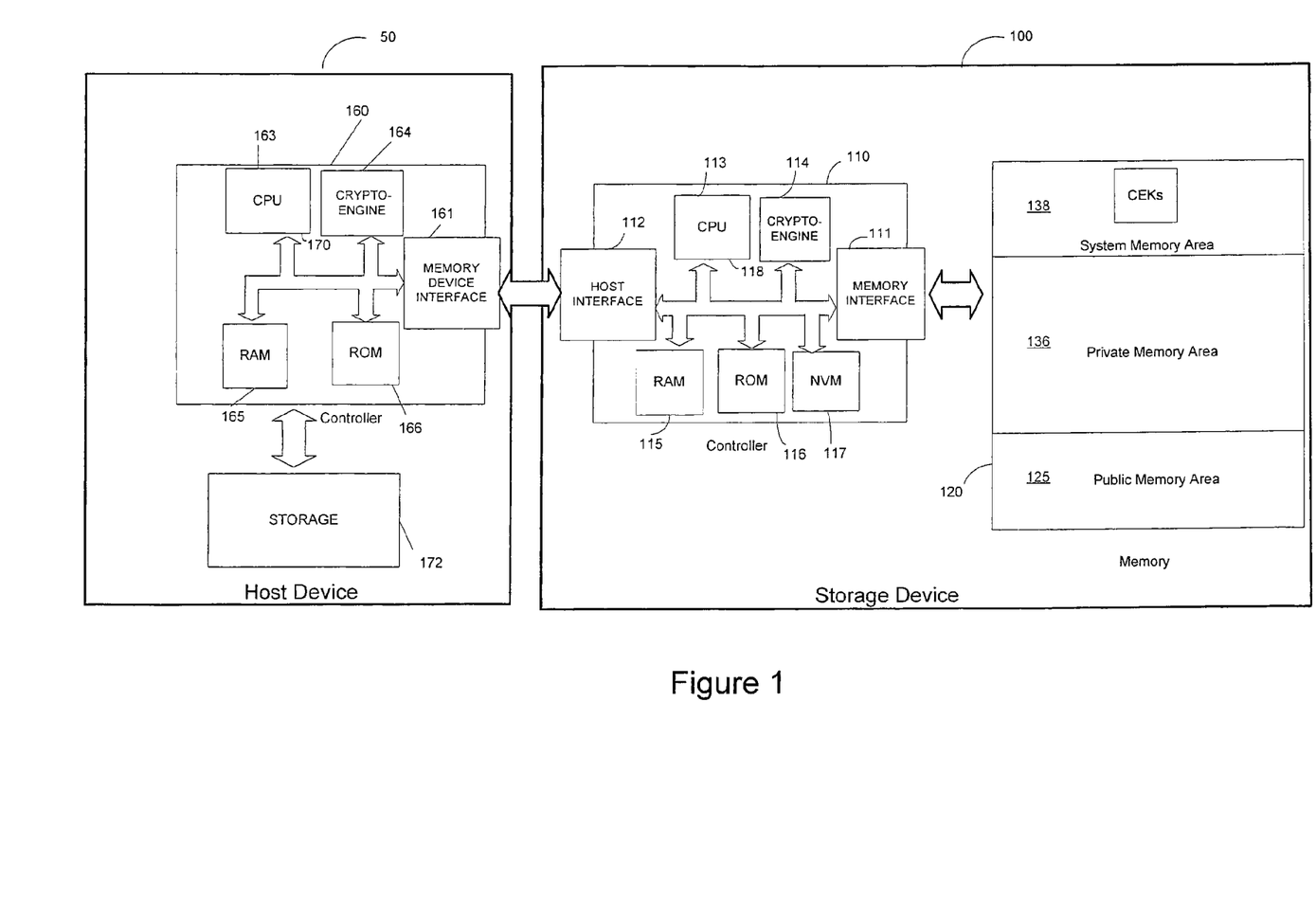
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors (interfaces) that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. In this embodiment, the storage device 100 is a mass storage device that can take any suitable form, such as, but not limited to, a handheld, removable memory card (such as a Secure Digital (SD) card or a MultiMedia Card (MMC)), a universal serial bus (USB) device, and a removable or non-removable hard drive (e.g., magnetic disk or solid-state drive). Alternatively, the storage device 100 can take the form of an embedded memory (e.g., a secure module embedded in the host device 50), such as an iNAND™ eSD/eMMC embedded flash drive by SanDisk Corporation.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 113, a hardware crypto-engine 114 operative to provide encryption and/or decryption operations, read access memory (RAM) 115, read only memory (ROM) 116 which can store firmware for the basic operations of the storage device 100, and a non-volatile memory (NVM) 117. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers ARC 625D, Atmel AT91SAM, Microchip PIC18F26K20, and Silicon Labs C8051F320. It should be noted that while the hardware crypto-engine 114 is part of the storage device 100 of this embodiment, this is an optional component, as these embodiments can be used with standard storage devices that do not contain a hardware crypto-engine.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. In this embodiment, the memory 120 comprises a public memory area 125 that is managed by a file system on the host 50, a private memory area 135 that is internally managed by the controller 110, and a system memory area 138 that is also internally managed by the controller 110. While the memory 120 in this embodiment contains a public memory area 125, a private memory area 136, and a system memory area 138, it should be noted that other configurations can be used in different embodiments. For example, in another embodiment, the memory can contain a public memory area and a private memory area but not a system memory area, or a public memory area and system memory area but not a private memory area.

As shown in FIG. 1, the system memory area 138 can store content encryption keys (CEKs) that encrypt content stored in the storage device 100. The public memory area 125, the private memory area 136, and/or the system memory area 138 can be different partitions of the same memory unit or can be different memory units. Also, some or all of the CEKs can be located in the NVM 117 in the controller 110. Other stored items (e.g., a super-distribution key, encrypted content, etc.) mentioned herein to be stored in a specific memory location may also be stored in a different memory location. Accordingly, for simplicity, the phrase "one or more memories storing" is used herein to reflect this flexibility. So, for example, the phrase "one or more memories storing a super-distribution key, a content encryption key, and content encrypted with a content encryption key" means that somewhere in the memories is stored (at least once) the super-distribution key, the content encryption key, and the content. In one embodiment, each of these items is stored only once, as opposed to each of the memories storing all three items, although that is also possible. For example, in one embodiment, the content encryption key is stored in the system memory area 138 (or the NVM 117), while the super-distribution key is stored in the system memory area 138, and the encrypted content is stored in the public memory area 125. Of course, this is just but one example, and other variations are possible. For example, as noted above, in some embodiments, the memory may not contain a system memory area. As such, the content encryption key and/or super-distribution key may be stored in the private memory area (or another location), instead of the system memory area, while the content is stored in the public memory area. In some other embodiments, the super distribution key could be generated dynamically between the source (host or storage) and the server or directly between the source and the target (host or storage).

Turning now to the host 50, the host 50 comprises a controller 160 that has a storage device interface 161 for interfacing with the storage device 100. The controller 160 also comprises a central processing unit (CPU) 163, a crypto-engine 164 operative to provide encryption and/or decryption operations, read access memory (RAM) 165, read only memory (ROM) 166, a security module 171, and storage 172. The storage device 100 and the host 150 communicate with each other via a storage device interface 161 and a host interface 112. The host 50 can contain other components (e.g., a display device, a speaker, a headphone jack, a video output connection, etc.), which are not shown in FIG. 1 to simplify the drawings. Also, other implementations of the host 50 are possible. For example, instead of containing a hardware crypto-engine, the CPU of the host may be able to perform cryptographic operations in software at a desirable speed.

Embodiments Related to Super-Distribution of Content

In super-distribution environments, a user is allowed to freely copy encrypted content (but not the content encryption key) from one storage device to another storage device. Since the content is encrypted and the content encryption key is not copied along with the content, the content will not be renderable on the target storage devices unless the user or application requests or purchases the content encryption key from a digital rights management (DRM) server. (Depending on the type of content, "render" can mean playing (e.g., when the content is a song or movie), deciphering (e.g., when the content is a game installer), or whatever action is needed to "enjoy" the content.) However, as mentioned above, a problem can occur when the content protection key is not known to the server, such as when the content protection key is internally-generated by the storage or host device or when the content protection key is provided to the storage or host device by an entity other than the server. To overcome this problem and allow content protected in this manner to be super-distributed and enjoyed, the storage or host device in one of these embodiments can use a separate key (referred to herein as a super-distribution key) known to the server to encrypt the content encryption key. The encrypted content and content encryption key are both super-distributed. Since the server has information that is needed to obtain the content encryption key from the super-distribution token, the use of the super-distribution key returns a level of control to the server that is otherwise taken away when the content encryption key is localized to the storage or host device. This embodiment will now be described in more detail.

Figure 2:
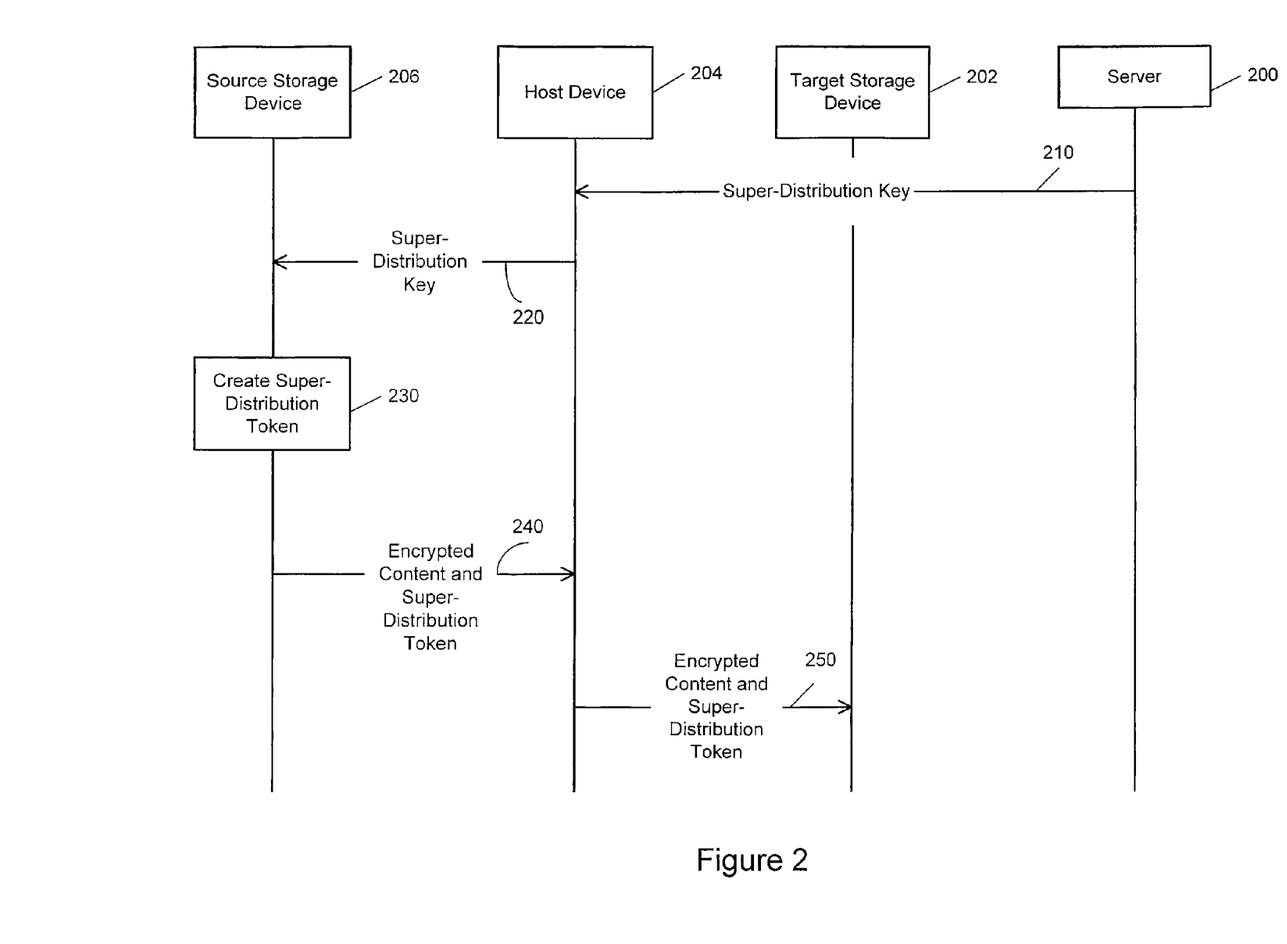
FIG. 2 is a flow diagram of a method of an embodiment for super-distributing content to a target storage device.

Returning to the drawings, FIG. 2 is a flow diagram of a method of an embodiment for super-distribution of content using a super-distribution key. The components used in this diagram are a server 200, a target source device 202, a host device 204, and a source storage device 206. The source storage device 206 stores both a content encryption key and content encrypted with the content encryption key. The content encryption key can be generated by a controller in the source storage device 206 or can be provided to the source storage device 206 from an external source (but, as explained below, not by the server 200 in this embodiment). As shown in FIG. 2, the server 200 sends a super-distribution key to the host device 204 (act 210), which then stores the super-distribution key in the source storage device 206 (act 220). Before the super-distribution key is sent, the source storage device 206 can provide a credential to the server 200 (e.g., via an authentication process) to prove that the source storage device 206 is authorized to receive the super-distribution key. (The super-distribution key can be dynamically generated as a result of the authentication and key exchange process between the source storage device 206 and the server 200.) Further, to protect the super-distribution key from interception and unauthorized use, a secure channel can be established between the server 200 and the source storage device 206 (e.g., using a session key that is generated after mutual authentication). Alternatively, a transport encryption key, known to the server 200 and the source storage device 206, can be used. In this alternative, the server 200 would encrypt the super-distribution key with the transport encryption key to protect the super-distribution key during transit, and, upon receipt, the source storage device 206 would decrypt the encrypted super-distribution key with the transport encryption key. As mentioned above, in this embodiment, the server 200 is not aware of the content encryption key when the server 200 provides the super-distribution key to the host device 204 and, in fact, may never be aware of the content encryption key.

The source storage device 206 then creates a super-distribution token by encrypting the content encryption key stored in the source storage device 206 with the super-distribution key received from the server 200 through the host device 204 (act 230). The super-distribution token can simply be the content encryption key encrypted with the super-distribution key or can contain additional information, such as, but not limited to, a reference to the super-distribution key, a content ID, a reference to the storage device, and a reference to the source and/or target storage device. This additional information can be encrypted along with the content encryption key or provided separately from the content encryption key, and the use of such additional information will be discussed below. The source storage device 206 then provides the encrypted content and the super-distribution token to the host device 204 (act 240), which stores both items in a target storage device 202 (act 250). (The source storage device 206 can "provide" the encrypted content and the super-distribution token in response to a request from the host device 204 (e.g., when the source storage device 206 is a slave device to the host device 204) or on its own initiative.) This transfer can be the result of a standard file system copy command or a special command. This transfer can also be initiated by the source storage device 206, such as when the content is "gifted" to the target storage device 202 from the source storage device 206. Since the user issuing the copy request is unlikely to be aware of the need to also copy the super-distribution token, the copying of the super-distribution token can be made transparent to the user. For example, the source storage device 206 can store data that associates the encrypted content with the super-distribution token so that when the encrypted content is copied from the source storage device 206, the super-distribution token is also copied. This association data can originate from the host device 204 or an external source (e.g., the server 200 or another entity). If the host device 204 has two storage device inputs, both the source and target storage devices 206, 202 can be plugged into the host device 204 at the same time during the copy operation; otherwise, the user can swap out the source storage device 206 for the target storage device 202 at the appropriate time during the copy operation.

Figure 3:
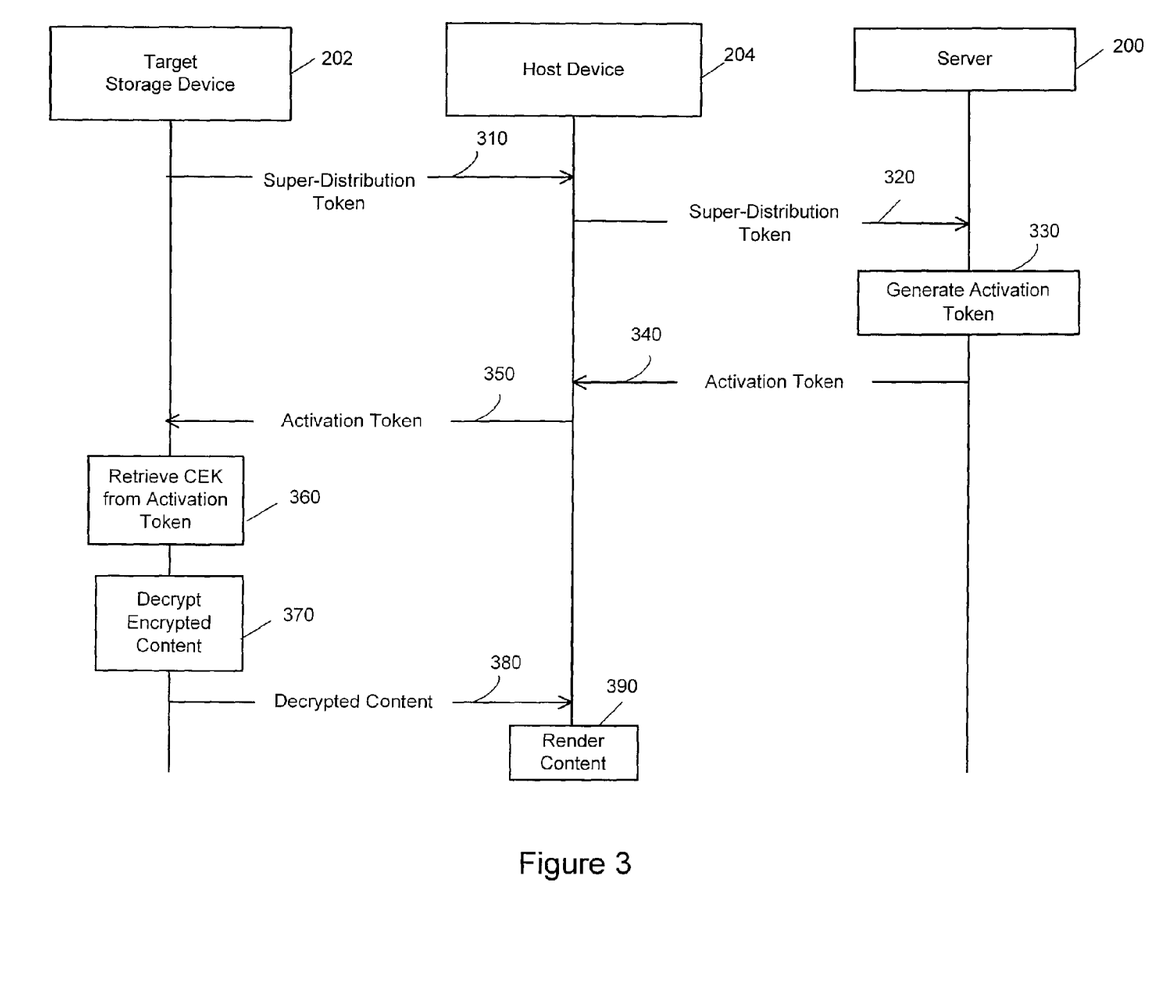
FIG. 3 is a flow diagram of a method of an embodiment for accessing and rendering content super-distributed to a target storage device.

FIG. 3 is a flow diagram showing how the content that was copied to the target storage device 202 can be accessed and rendered. In this example, the target storage device 202 is being used by the same host device 204 that copied the content and super-distribution token to the target storage device 202. This can occur, for example, when a user transfers protected content from one storage device to a new or higher-capacity storage device but uses the same host device. However, it should be noted that a different host device can be used. This can occur, for example, when one user copies the content to second user's storage device using one host device, and the second user attempts to access the content on a different host device.

To decrypt the encrypted content on the target storage device 202, the target storage device 202 needs to recover the content encryption key from the super-distribution token. In this embodiment, this is done by providing the super-distribution token from the target storage device 202 to the server 200 via the host device (acts 310 and 320). (The target storage device 202 can "provide" the super-distribution token in response to a request from the host device 204 (e.g., when the source storage device 206 is a slave device to the host device 204) or on its own initiative.) This can be triggered by a standard or specialized play command issued on the host device 204. The server 200 then generates an activation token from the received super-distribution token (act 340 350). The activation token contains at least the content encryption key and can also contain additional information, such as, but not limited to, a reference to the super-distribution key, a content ID, a reference to the storage device, and a reference to the source and/or target storage device. The use of such additional information will be discussed below. So, where the super-distribution token is just the content encryption key encrypted with the super-distribution key, the server 200 can generate the activation token simply by decrypting the super-distribution token with the super-distribution key to obtain the content encryption key (i.e., the activation token is just the content encryption key). In that situation, the server 200 would then become aware of the content encryption key. However, at the time the server 200 provided the super-distribution key to the source storage device 206, the server 200 was not aware of the content encryption key. As will be discussed below, the super-distribution token and/or the activation token may contain additional information, which may result in the server 200 never being aware of the content encryption key.

The server 200 then returns the activation token to the target storage device 202 via the host device (act 350). The server 200 can encrypt the activation token with a transport encryption key to protect the super-distribution key during transit, and, upon receipt, the target storage device 202 can decrypt the encrypted activation token with the transport encryption key. For added protection, the target storage device 202 can then re-encrypt the activation token and/or content encryption key with a key unknown to the server 200.

Returning to FIG. 3, after the target storage device 202 gets the activation token, it retrieves the content encryption key from the activation token (act 360). If the activation token contains an encrypted version of the content encryption key (as discussed below), this act can include decrypting the activation token to obtain the content encryption key in the clear. Otherwise, this act can simply be reading the content encryption key from the activation token. In either case, when the target storage device 202 obtains the content encryption key, it can decrypt the encrypted content with the content encryption key (act 370) and send the decrypted content to the host device 204 for rendering (acts 380 and 390).

Figure 4:
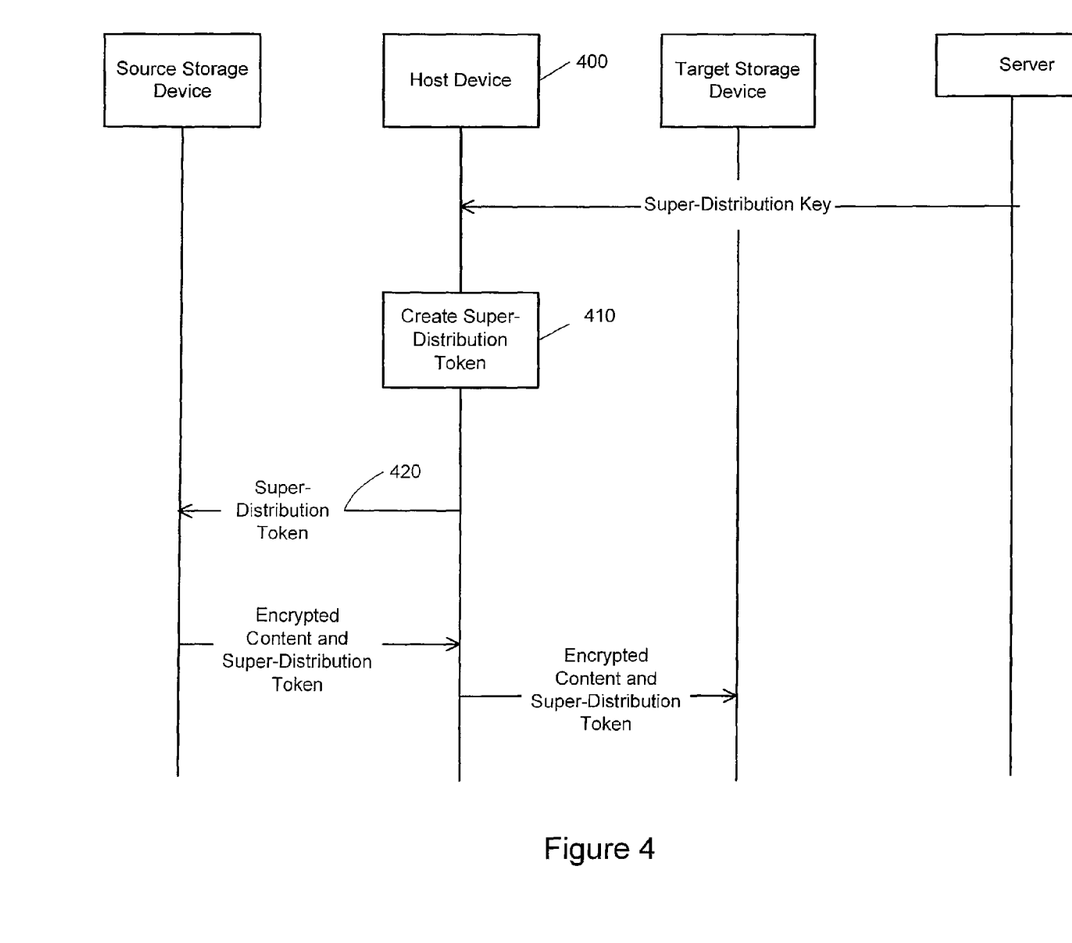
FIG. 4 is a flow diagram of a method of another embodiment in which a host device creates a super-distribution token.
Figure 5:
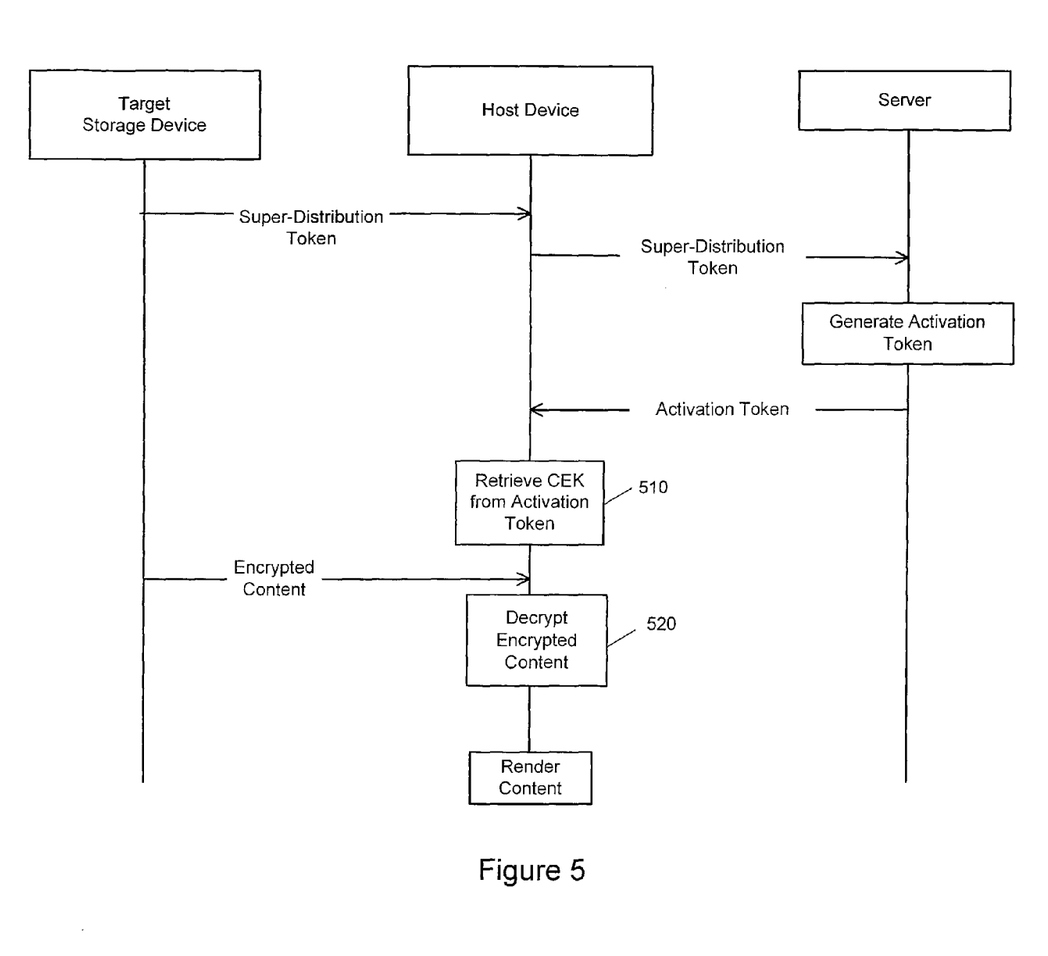
FIG. 5 is a flow diagram of a method of another embodiment in which a host device retrieves a content encryption key from an activation token.

In the above examples, the source storage device 206 had the capability of creating a super-distribution token because of the intelligence provided by its controller. In situations where the source storage device is a simple storage device and does not have such functionality, the host device can create the super-distribution token and store it in the source storage device (see FIG. 4, acts 410 and 420). Likewise, if the target storage device does not have the capability to retrieve a content encryption key from an activation token or decrypt encrypted content, those acts can be performed by the host device (see FIG. 5, acts 510 and 520). Also, while the terms source storage device and target storage device have been used in the above examples, it should be noted that a given storage device can be considered the source in one situation and the target in another situation. That is, a given storage device can have the ability both to create super-distribution tokens (when it is acting as a source storage device) and to retrieve a content encryption key from an activation token (when it is acting as a target storage device).

Figure 6:
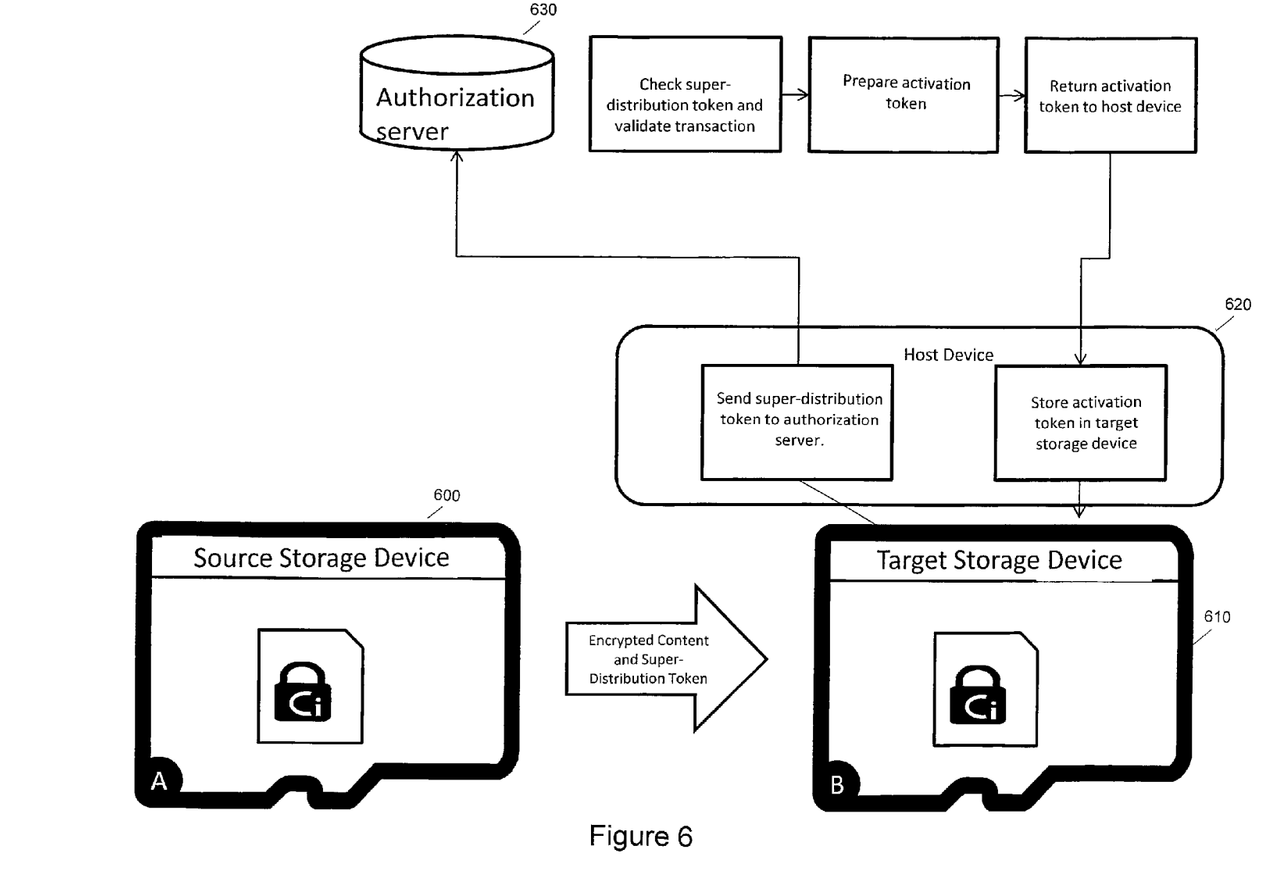
FIG. 6 is a block diagram of a system for super-distribution of content using a super-distribution key.

Turning again to the drawings, FIG. 6 is a block diagram that illustrates the embodiment discussed above. As shown in FIG. 6, a source storage device 600 has already provided encrypted content and a super-distribution token to a target storage device 610. A host device 620 in communication with the target storage device 610 retrieves the super-distribution token and sends it to an authorization server 630. If the authorization server 630 charges a fee for accessing the content, the authorization server 630 can check the super-distribution token and validate the transaction (e.g., by charging the user's credit card). The authorization server 630 then prepares the authorization token, as described above, and returns the authorization token to the host device 620. The host device then stores the activation token in the target storage device 610. The target storage device 610 can then decrypt the encrypted content and provide it to the host device 620 for rendering.

As mentioned above, if the super-distribution token is just the content encryption key encrypted with the super-distribution key and the server creates the activation token by decrypting the super-distribution token with the super-distribution key, the server will become aware of the content encryption key (although it was not aware of the content encryption key when it provided the super-distribution key to the source storage device). In order to continue to keep the content encryption key secret from the server, instead of the super-distribution token being just the content encryption key encrypted with the super-distribution key, the content encryption key can be first encrypted with a separate key (e.g., a "card encryption key") and then the result of that encryption can be encrypted with the super-distribution key. That way, when the super-distribution token is decrypted by the server, the result will be an encrypted version of the content encryption key. Assuming that the server is unaware of the card encryption key, the server will not be able to decrypt and have access to the content encryption. However, the target storage device would know the card encryption key and be able to decrypt and use the content encryption key.

As also mentioned above, the super-distribution token and/or activation token can contain additional data. Such additional data can be the identification of the card encryption key used to encrypt the content encryption key, if the source and target storage devices contain more than one card encryption key. With such additional data, the target storage device will know which card encryption key to use to decrypt the activation token. In other words, the additional data can be used to provide some information, such as a reference to the super-distribution key, in order to ensure the content encryption key can be unwrapped with the correct super distribution key. Similarly, if there are a variety of super-distribution keys used by the source storage device and the server, the super-distribution token can contain additional data informing the server which super-distribution key the source storage device used to encrypt the content encryption key. As another example, the additional data in the super-distribution token can identify the serial number or other identifier of the target source device, which can be used by the server to choose a particular key to encrypt the activation token with, so only the intended target storage device can decrypt and use the activation token or an identifier of the super-distribution key used by the server.

Exemplary Copy Methods

In the embodiments discussed above, content on a source storage device was ciphered with a content encryption key unknown outside of the source storage device (or, more generally, outside of a security system trusted with the content encryption key), and the content encryption key was securely made available to a target storage device holding a copy of the content. Different super-distribution methods can be used depending on how access to the content encryption key is protected. The methods to transfer the content encryption key can vary depending on whether the source and target devices are required to both be present when the copy operation takes place. Furthermore, the methods can vary based on whether the copy authorization (e.g., the transfer of the content encryption key) can take place before, during, or after the content is transferred (i.e., depending on whether the copy is aware of the protection or not). For example, the following use cases are possible: (1) a user copies a piece of protected content from a first device to a second device and then gets the copy authorized, (2) a user gets an authorized copy of protected content for any compliant device and then uses that copy on a second device, and (3) both the source content and the target devices are available when the user makes an authorized copy on the target device (e.g., when both the source and target devices are connected to the same host or connectable through a network or cloud).

The transfer of the content encryption key is the main challenge because the content encryption key is unknown from the second device yet it is required to enjoy the copy of the protected content. As the content encryption key is the essence of the security, it is usually embedded in the security system and thus must be imported in the security system of the second device where it could become usable (the security system does not need to be embedded in the device). As such, it must be at first securely extracted from the security system of the source and securely transferred to the system of the target device.

The following are examples of two families of methods that can be used. In the first family, the copy is done using typical file manager, and, in the second family, the copy is done by a system aware of the content protection. Of course, these are merely example, and other methods can be used.

Family 1: Methods where Copy is Done Using a Typical File Manager

The first step of this method is copying the content encryption key to the second device using a typical file manager. In this case, the content encryption key has typically been wrapped (ciphered) in a previous step and is available for copy with a standard file manager application. The transfer could be: (a) a manual transfer, i.e., the wrapped content encryption key is stored in a file that could be manually copied by the user to the second device or (b) associated with content, i.e., the wrapped content encryption key is associated with the content and copied along with it (for example, the protected content file also contains the wrapped content encryption key). Through at least one of the above transfers, the second device is provided with the content and the wrapped content encryption key.

The second step is to ensure the copy gets authorized and becomes usable. In one embodiment, the content encryption key is wrapped by a key known to the authorization system. In that embodiment, the wrapped content encryption key is provided to the authorization system that issues the content encryption key to the security system of the second device. In another embodiment, the content encryption key is wrapped with a key known by the second device. In that embodiment, authorization can entail: (a) delivering the wrapped content encryption key into the security system of the second device, (b) providing an authorization message to the security system of the second device to activate the use of the content encryption key, or (c) a combination of both delivering and activating the delivered content encryption key.

Family 2: Methods where the Copying is Aware of the Content Protection

There are several methods that can be used to copy the content encryption key to the second device where copying is aware of the protection. For example, the copying system could be aware of the protection and ensure that the content encryption key gets transferred before, during, or after the authorization, where the target device could be known or unknown. These variations can open the following new scenarios. (The same scenarios as shown earlier in step 2 can also apply to a content encryption key that has been transferred and is pending authorization to become usable.)

In one scenario, during the "copy from" operation, the content encryption key is exported out to be associated with the content and would be present along with the copied content on the target device yet unusable until the authorization is received. Alternatively, an authorization message can be required in order to export out the content encryption key to the security system of the second device. In that case, one option is to wrap the content encryption key specifically for the target device in order to avoid additional uncontrolled copies. In another scenario, during the copy, the content encryption key is transferred using a secure channel between both devices to the target device where it is unusable until the authorization is received. Alternatively, an authorization message can be required in order to establish the secure channel and authorize the copy to the second device.

In yet another scenario, a number of copies is pre-authorized, and the protection-aware copy will ensure that the authorized number of copies is not exceeded and that the content encryption key is securely transferred to the security system of the second device. The use of an active device, such as TrustedFlash™ device from SanDisk Corporation, can reduce the risk of breach and ensure that no extra copies are generated even by hacking the host. TrustedFlash™ technology protects the content encryption key using access control, and, as such, the content encryption key cannot be freely copied. As TrustedFlash™ comes with an accounting system, it allows for multiple options. For example, the content encryption key can be wrapped then made accessible for copy with a regular file manager. In that case, the wrapped content encryption key can be sent to the authorization system that would accordingly import it in the second TrustedFlash™ device. The second TrustedFlash™ device does not have to be known at the time of wrapping the content encryption key, and the wrap key can be either known by the authorization system or shared by TrustedFlash™ devices. As another example, the authorization system can securely transfer a copy of the content encryption key between two TrustedFlash™ devices. In that case, the authorization system does not access the content encryption key, yet it controls the copy. In some other cases, the authorization allows the account use to render the content to access the content encryption key that has been imported into the TrustedFlash™ system.

Pre-Approved Copy for Physical Distribution

In another embodiment, the authorization system is only used to pre-approve the copy; thus, no authorization system is used or needed during or after the copy. This scenario presents the highest risk of breach, and a very secure approach between two active storage media devices is preferably used. Consider, for example, a first device that contains the content encryption key and a pre-approved authorization for one copy and the situation where a user wishes to exercise his/her rights to make a copy to a second device of the same kind. A protection-aware system can be used for the copy but its role is limited to ensure the dialog between the two devices in a similar way of a card dealer deals cards—he does not see the cards and does not participate in the game. The protection-aware system ensures the communication between both devices and requests that the authorization is transferred. The communication channel is typically a secure channel resulting from mutual authentication of both devices. The protection-aware system could ensure that all commands from the sequence to perform the copy are performed properly.

At some point in the sequence, the source device validates the request and acts accordingly. In some cases, that means checking that the available copy of the content encryption key exists on the first device then, accordingly, securely transferring such available copy to the second device. In some cases, that means securely transferring the content encryption key and recording the transaction. Alternatively, a copy of the content encryption key can be transferred and copying is not further allowed once no available copies are left. In some other cases, activated means that the content encryption key has been received by the second device, and the transaction is recorded in an area controlled by the source device. The approach could be extended to support a transfer of content from the first device to the second. In that case, once the transaction has been successfully completed, the content is only available for play on the second device and the copy that may still exist on the first device has been revoked or suspended.

In some cases, there might be an unlimited pre-approved number of copies. This could be particularly useful to spread content whose revenue model is viral instead of per-copy. In such a case, it may be desirable to allow the copy to be further copied.

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A host device comprising:
   one or more memories storing a super-distribution key and a content encryption key; and
   a controller in communication with the one or more memories, wherein the controller is operative to:
      retrieve content from a storage device, wherein the content is encrypted with the content encryption key;
      create a super-distribution token by encrypting the content encryption key with a first encryption key and then encrypting a result of that encryption with the super-distribution key, wherein the super distribution token includes a reference to the first encryption key, wherein the reference is unencrypted; and
      store the super-distribution token and the encrypted content retrieved from the source storage device in a target storage device, wherein the target storage device stores a plurality of encryption keys and uses the reference in the super distribution token to select one of the plurality of encryption keys to decrypt the content encryption key.

2. The host device of claim 1, wherein the controller is further configured to receive data that associates the encrypted content with the super-distribution token so that when the encrypted content is copied from the source storage device, the super-distribution token is also copied.

3. The host device claim 1, wherein a number of copies of the content is pre-authorized.

4. The host device of claim 1, wherein the controller is further operative to receive the super-distribution key from a server.

5. The host device of claim 4, wherein the controller is further operative to provide a credential to the server to prove that the host device is authorized to receive the super-distribution key.

6. The host device of claim 4, wherein the server is unaware of the content encryption key when the server provides the super-distribution key to the host device.

7. The host device of claim 1, wherein the controller is further operative to receive information from a server to import the super-distribution key via the host device.

8. The host device of claim 1, wherein the super-distribution token further comprises additional data, and wherein both the additional data and the content encryption key are encrypted by the super-distribution key.

9. The host device of claim 1, wherein the super-distribution token further comprises additional data, and wherein the super-distribution key is used to encrypt only the content encryption key and the additional data is free of such super-distribution key encryption.

10. The host device of claim 9, wherein the additional data includes at least one of a reference to the super-distribution key, a content ID, a reference to the storage device, and a reference to the target storage device.

11. The host device of claim 1, wherein the controller is further configured to generate the content encryption key.

12. The host device of claim 1, wherein the controller is further configured to receive the content encryption key from a source external to the host device.

13. The host device claim 1, wherein the super-distribution token and the encrypted content are retrieved from the source storage device and stored in a target storage device using a file manager copy command.

14. A method for super-distribution of content, the method comprising:
    performing the following in a host device storing a super-distribution key and a content encryption key, the host device being in communication with a source storage device storing content encrypted with the content encryption key:
       creating a super-distribution token by encrypting the content encryption key with a first encryption key and then encrypting a result of that encryption with the super-distribution key, wherein the super distribution token includes a reference to the first encryption key, wherein the reference is unencrypted; and
       storing the super-distribution token and the encrypted content retrieved from the source storage device in a target storage device, wherein the target storage device stores a plurality of encryption keys and uses the reference in the super distribution token to select one of the plurality of encryption keys to decrypt the content encryption key.

15. The method of claim 14 further comprising receiving data that associates the encrypted content with the super-distribution token so that when the encrypted content is copied from the source storage device, the super-distribution token is also copied.

16. The method claim 14, wherein a number of copies of the content is pre-authorized.

17. The method of claim 14 further comprising receiving the super-distribution key from a server.

18. The method of claim 17 further comprising providing a credential to the server to prove that the storage device is authorized to receive the super-distribution key.

19. The method of claim 17, wherein the server is unaware of the content encryption key when the server provides the super-distribution key to the host device.

20. The method of claim 14, wherein the controller is further operative to receive information from a server to import the super-distribution key via the host device.

21. The method of claim 14, wherein the super-distribution token further comprises additional data, and wherein both the additional data and the content encryption key are encrypted by the super-distribution key.

22. The method of claim 14, wherein the super-distribution token further comprises additional data, and wherein the super-distribution key is used to encrypt only content encryption key and the additional data is free of such super-distribution key encryption.

23. The method of claim 22, wherein the additional data includes at least one of a reference to the super-distribution key, a content ID, a reference to the storage device, and a reference to the target storage device.

24. The method of claim 14 further comprising generating the content encryption key.

25. The method of claim 14 further comprising receiving the content encryption key from a source external to the host device.

26. The method claim 14, wherein the super-distribution token and the encrypted content are retrieved from the source storage device and stored in a target storage device using a file manager copy command.

27. A host device comprising:
a memory storing a super-distribution token and a plurality of additional encryption keys, wherein the super-distribution token comprises a content encryption key encrypted with one of the plurality of additional encryption keys and then encrypted with a super-distribution key; and
a controller in communication with the memory, wherein the controller is operative to:
receive the encrypted content from a storage device, wherein the encrypted content is encrypted with the content encryption key;
provide the super-distribution token to a server, wherein the server is configured to generate an activation token from the super-distribution token by decrypting the super-distribution token with the super-distribution key, wherein the activation token contains the content encryption key encrypted with the one of the plurality of additional encryption keys and further contains a reference to the one of the plurality of additional encryption keys, wherein the reference is unencrypted;
receive the activation token from the server;
select one of the additional keys based on the reference in the activation token;
decrypt the content encryption key from the activation token using the selected one of the additional keys; and
decrypt the encrypted content received from the storage device using the content encryption key.

28. The host device of claim 27, wherein the encrypted version of the content encryption key is encrypted with a super-distribution key, and wherein the server stores the super-distribution key and is configured to generate the activation token by decrypting the super-distribution token using the super-distribution key.

29. The host device of claim 27, wherein, in addition to the content encryption key, the activation token contains additional data.

30. The host device of claim 29, wherein the additional data includes at least one of a reference to the super-distribution key, a content ID, a reference to the storage device, and a reference to a storage device that was the source of the encrypted content.

31. The host device of claim 27, wherein the activation token contains the content encryption key in clear form.

32. The host device of claim 27, wherein the activation token contains the content encryption key in an encrypted form.

33. The host device of claim 32, wherein the content encryption key is encrypted with a key known to the host device but unknown to the server.

34. The host device of claim 32, wherein the content encryption key is encrypted with a transport encryption key known to the server, and wherein the controller is further configured to decrypt the encrypted content encryption key with the transport encryption key and then re-encrypt the content encryption key with a key unknown to the server.

35. The host device of claim 27, wherein the controller is further operative to provide a credential to the server to prove that the host device is authorized to receive the authorization token.

36. A method for super-distribution of content, the method comprising:
performing the following in a host device in communication with a storage device storing content encrypted with a content encryption key, wherein the host device stores a plurality of additional encryption keys and a super-distribution token comprising the content encryption key encrypted with one of the plurality of additional encryption keys and then encrypted with a super-distribution key:
providing the super-distribution token to a server, wherein the server is configured to generate an activation token from the super-distribution token by decrypting the super-distribution token with the super-distribution key, wherein the activation token contains the content encryption key encrypted with the one of the plurality of additional encryption keys and further contains a reference to the one of the plurality of additional encryption keys wherein the reference is unencrypted;
receiving the activation token from the server;
selecting one of the additional keys based on the reference in the activation token;
decrypting the content encryption key from the activation token using the selected one of the additional keys; and
decrypting the encrypted content retrieved from the storage device using the content encryption key.

37. The method of claim 36, wherein the encrypted version of the content encryption key is encrypted with a super-distribution key, and wherein the server stores the super-distribution key and is configured to generate the activation token by decrypting the super-distribution token using the super-distribution key.

38. The method of claim 36, wherein, in addition to the content encryption key, the activation token contains additional data.

39. The method of claim 38, wherein the additional data includes at least one of a reference to the super-distribution key, a content ID, a reference to the storage device, and a reference to a storage device that was the source of the encrypted content.

40. The method of claim 36, wherein the activation token contains the content encryption key in clear form.

41. The method of claim 36, wherein the activation token contains the content encryption key in an encrypted form.

42. The method of claim 41, wherein the content encryption key is encrypted with a key known to the host device but unknown to the server.

43. The method of claim 41, wherein the content encryption key is encrypted with a transport encryption key known to the server, and wherein the method further comprises decrypting the encrypted content encryption key with the transport encryption key and then re-encrypting the content encryption key with a key unknown to the server.

44. The method of claim 36 further comprising providing a credential to the server to prove that the host device is authorized to receive the authorization token.

45. A storage device comprising:
one or more memories storing a super-distribution key and a content encryption key; and
a controller in communication with the one or more memories, wherein the controller is operative to:
create a super-distribution token by encrypting the content encryption key with a first encryption key and then encrypting a result of that encryption with the super-distribution key, wherein the super distribution token includes a reference to the first encryption key, wherein the reference is unencrypted; and provide the super-distribution token to a host device for storage in a target storage device, wherein the target storage device stores a plurality of encryption keys and uses the reference in the super distribution token to select one of the plurality of encryption keys to decrypt the content encryption key.

46. The storage device of claim 45, wherein the one or more memories further stores content encrypted with the content encryption key, and wherein the controller is further operative to receive data that associates the encrypted content with the super-distribution token so that when the encrypted content is copied from the storage device, the super-distribution token is also copied.

47. The storage device of claim 45, wherein the one or more memories further stores content encrypted with the content encryption key, and wherein a number of copies of the content is pre-authorized.

48. The storage device of claim 45, wherein the controller is further operative to receive the super-distribution key from a server via the host device.

49. The storage device of claim 48, wherein the controller is further operative to provide a credential to the server to prove that the storage device is authorized to receive the super-distribution key.

50. The storage device of claim 48, wherein the server is unaware of the content encryption key when the server provides the super-distribution key to the host device.

51. The storage device of claim 45, wherein the controller is further operative to receive information from a server to import the super-distribution key via the host device.

52. The storage device of claim 45, wherein the super-distribution token further comprises additional data, and wherein both the additional data and the content encryption key are encrypted by the super-distribution key.

53. The storage device of claim 45, wherein the super-distribution token further comprises additional data, and wherein the super-distribution key is used to encrypt only the content encryption key and the additional data is free of such super-distribution key encryption.

54. The storage device of claim 53, wherein the additional data includes at least one of a reference to the super distribution key, a content ID, a reference to the storage device, and a reference to the target storage device.

55. The storage device of claim 45, wherein the controller is further operative to generate the content encryption key.

56. The storage device of claim 45, wherein the controller is further operative to receive the content encryption key from a source external to the storage device.

57. The storage device of claim 45, wherein the super-distribution key is dynamically generated as a result of an authentication and key exchange process between the storage device and a server.

58. A method for super-distribution of content, the method comprising:
performing the following in a storage device in communication with a host device, wherein the storage device stores a super-distribution key and a content encryption key:
creating a super-distribution token by encrypting the content encryption key with a first encryption key and then encrypting a result of that encryption with the super-distribution key, wherein the super distribution token includes a reference to the first encryption key, wherein the reference is unencrypted; and providing the encrypted content and the super-distribution token to the host device for storage in a target storage device, wherein the target storage device stores a plurality of encryption keys and uses the reference in the super distribution token to select one of the plurality of encryption keys to decrypt the content encryption key.

59. The method of claim 58, wherein the storage device further stores content encrypted with the content encryption key, and wherein the method further comprises receiving data that associates the encrypted content with the super-distribution token so that when the encrypted content is copied from the storage device, the super-distribution token is also copied.

60. The method of claim 58, wherein the one or more memories further stores content encrypted with the content encryption key, and wherein a number of copies of the content is pre-authorized.

61. The method of claim 58 further comprising receiving the super-distribution key from a server via the host device.

62. The method of claim 61 further comprising providing a credential to the server to prove that the storage device is authorized to receive the super-distribution key.

63. The method of claim 61, wherein the server is unaware of the content encryption key when the server provides the super-distribution key to the host device.

64. The method of claim 58, wherein the controller is further operative to receive information from a server to import the super-distribution key via the host device.

65. The method of claim 58, wherein the super-distribution token further comprises additional data, and wherein both the additional data and the content encryption key are encrypted by the super-distribution key.

66. The method of claim 58, wherein the super-distribution token further comprises additional data, and wherein the super-distribution key is used to encrypt only content encryption key and the additional data is free of such super-distribution key encryption.

67. The method of claim 66, wherein the additional data includes at least one of a reference to the super-distribution key, a content ID, a reference to the storage device, and a reference to the target storage device.

68. The method of claim 58 further comprising generating the content encryption key.

69. The method of claim 58 further comprising receiving the content encryption key from a source external to the storage device.

70. A storage device comprising:
one or more memories storing content encrypted with a content encryption key, a plurality of additional encryption keys, and a super-distribution token, wherein the super-distribution token comprises the content encryption key encrypted with one of the plurality of additional encryption keys and then encrypted with a super-distribution key; and
a controller in communication with the one or more memories, wherein the controller is operative to:
provide the super-distribution token to a server via a host device, wherein the server is operative to generate an activation token from the super-distribution token by decrypting the super-distribution token with the super-distribution key, wherein the activation token contains the content encryption key encrypted with the one of the plurality of additional encryption keys and further contains a reference to the one of the plurality of additional encryption keys, wherein the reference is unencrypted;

receive the activation token from the server via the host device;

select one of the additional keys based on the reference in the activation token;

decrypt the content encryption key from the activation token using the selected one of the additional keys; and decrypt the encrypted content using the content encryption key.

71. The storage device of claim 70, wherein a number of copies of the content is pre-authorized.

72. The storage device of claim 70, wherein the encrypted version of the content encryption key is encrypted with a super-distribution key.

73. The storage device of claim 70, wherein, in addition to the content encryption key, the activation token contains additional data.

74. The storage device of claim 70, wherein the additional data includes at least one of a reference to the super-distribution key, a content ID, a reference to the storage device, and a reference to a storage device that was the source of the encrypted content.

75. The storage device of claim 70, wherein the activation token is encrypted with a transport encryption key known to the server, and wherein the controller is further operative to decrypt the encrypted activation token with the transport encryption key.

76. The storage device of claim 70, wherein the controller is further operative to provide a credential to the server to prove that the storage device is authorized to receive the authorization token.

77. A method for super-distribution of content, the method comprising:

performing the following in a storage device in communication with a host device, wherein the storage device stores content encrypted with a content encryption key, a plurality of additional encryption keys, and a super-distribution token, and wherein the super-distribution token comprises the content encryption key encrypted with one of the plurality of additional encryption keys and then encrypted with a super-distribution key:

providing the super-distribution token to a server via the host device, wherein the server is operative to generate an activation token from the super-distribution token by decrypting the super-distribution token with the super-distribution key, and wherein the activation token contains the content encryption key encrypted with the one of the plurality of additional encryption keys and further contains a reference to the one of the plurality of additional encryption keys, wherein the reference is unencrypted;

receiving the activation token from the server via the host device;

selecting one of the additional keys based on the reference in the activation token;

decrypting the content encryption key from the activation token using the selected one of the additional keys; and decrypting the encrypted content using the content encryption key.

78. The method of claim 77, wherein a number of copies of the content is pre-authorized.

79. The method of claim 77, wherein the encrypted version of the content encryption key is encrypted with a super-distribution key.

80. The method of claim 77, wherein, in addition to the content encryption key, the activation token contains additional data.

81. The method of claim 80, wherein the additional data includes at least one of a reference to the super-distribution key, a content ID, a reference to the storage device, and a reference to a storage device that was the source of the encrypted content.

82. The method of claim 77, wherein the activation token is encrypted with a transport encryption key known to the server, and wherein the method further comprises decrypting the encrypted activation token with the transport encryption key.

83. The method of claim 77 further comprising providing a credential to the server to prove that the storage device is authorized to receive the authorization token.

84. The method of claim 77, wherein a number of copies of the content is pre-authorized.

* * * * *

UNITED STATES PATENT AND TRADEMARK OFFICE
CERTIFICATE OF CORRECTION

PATENT NO. : 9,015,479 B2  Page 1 of 1
APPLICATION NO. : 13/328823
DATED : April 21, 2015
INVENTOR(S) : Jogand-Coulomb et al.

It is certified that error appears in the above-identified patent and that said Letters Patent is hereby corrected as shown below:

In the Claims

Column 11, claim 1, line 20, after "retrieve content from a" insert --source--.

Signed and Sealed this
Fifteenth Day of September, 2015

Michelle K. Lee
*Director of the United States Patent and Trademark Office*